(12) United States Patent
Lee

(10) Patent No.: US 7,889,482 B2
(45) Date of Patent: Feb. 15, 2011

(54) DISPLAY ASSEMBLY FOR REFRIGERATOR

(75) Inventor: Sung-Ae Lee, Busan (KR)

(73) Assignee: LG Electronics Inc., Seoul (KR)

( * ) Notice: Subject to any disclaimer, the term of this patent is extended or adjusted under 35 U.S.C. 154(b) by 906 days.

(21) Appl. No.: 11/766,011

(22) Filed: Jun. 20, 2007

(65) Prior Publication Data

US 2007/0295020 A1  Dec. 27, 2007

(30) Foreign Application Priority Data

Jun. 21, 2006  (KR) .................... 10-2006-0056083

(51) Int. Cl.
*G06F 1/16* (2006.01)
(52) U.S. Cl. ............................ 361/679.07; 361/679.21; 361/679.29; 248/289.11; 248/917; 312/312.5; 62/137; 62/331
(58) Field of Classification Search ............ 361/679.21; 248/923
See application file for complete search history.

(56) References Cited

U.S. PATENT DOCUMENTS

| | | | | | |
|---|---|---|---|---|---|
| 3,781,047 | A | * | 12/1973 | Surko, Jr. ................ | 292/251.5 |
| 3,836,221 | A | * | 9/1974 | Whistler et al. ............ | 312/237 |
| 3,970,274 | A | * | 7/1976 | Resk ....................... | 248/185.1 |
| 4,490,986 | A | * | 1/1985 | Paddock .................... | 62/127 |
| 4,645,153 | A | * | 2/1987 | Granzow et al. ........... | 248/181.2 |
| 5,102,081 | A | * | 4/1992 | Barchus .................. | 248/181.1 |
| 5,201,896 | A | * | 4/1993 | Kruszewski ............. | 248/278.1 |
| 5,673,170 | A | * | 9/1997 | Register ................. | 361/679.06 |
| 5,799,372 | A | * | 9/1998 | Brunner et al. ........... | 16/342 |
| 6,131,812 | A | * | 10/2000 | Schneider ................ | 235/385 |
| 6,152,410 | A | * | 11/2000 | Mark ..................... | 248/220.1 |
| 6,158,795 | A | * | 12/2000 | Gray et al. ............... | 296/37.8 |
| 6,205,022 | B1 | * | 3/2001 | Bhatia et al. ............ | 361/679.52 |
| 6,347,776 | B1 | * | 2/2002 | Chuang ................. | 248/288.51 |
| 6,418,010 | B1 | * | 7/2002 | Sawyer ................. | 361/679.05 |
| 6,418,017 | B1 | * | 7/2002 | Patel et al. ................ | 361/700 |
| 6,522,530 | B2 | * | 2/2003 | Bang ..................... | 361/679.06 |
| 6,585,203 | B1 | * | 7/2003 | Euker .................... | 248/200.1 |
| 6,691,969 | B2 | * | 2/2004 | Fretschner et al. ......... | 248/393 |
| 6,692,093 | B1 | * | 2/2004 | Park et al. ............... | 312/405.1 |
| 6,851,226 | B2 | * | 2/2005 | MacGregor et al. ......... | 52/36.1 |
| 6,927,871 | B1 | * | 8/2005 | Silverbrook et al. ....... | 358/1.15 |
| 7,090,141 | B2 | * | 8/2006 | Roh et al. ................ | 236/51 |
| 7,168,665 | B2 | * | 1/2007 | Hong et al. .............. | 248/125.1 |
| 7,195,214 | B2 | * | 3/2007 | Lee et al. ................ | 248/125.8 |
| 7,445,399 | B2 | * | 11/2008 | Dunn et al. ............... | 403/150 |
| 7,515,429 | B1 | * | 4/2009 | Schmidt et al. ............ | 361/727 |

(Continued)

FOREIGN PATENT DOCUMENTS

CN  2690938 Y  4/2005

(Continued)

*Primary Examiner*—Jayprakash N Gandhi
*Assistant Examiner*—Anthony Q Edwards
(74) *Attorney, Agent, or Firm*—Birch, Stewart, Kolasch & Birch, LLP

(57) ABSTRACT

A display assembly for a refrigerator includes: a display; a frame having a mounting part for mounting the display and provided on an outer wall surface of a refrigerator; and a tilting unit fixed to the display and the mounting part and allowing the display to be tilted. A direction of a screen of a display unit can be controlled, and thus, restrictions of a viewing angle of the display can be overcome.

8 Claims, 8 Drawing Sheets

U.S. PATENT DOCUMENTS

| | | | |
|---|---|---|---|
| 7,571,883 B2 * | 8/2009 | Van Groesen et al. | 248/282.1 |
| 7,713,090 B2 * | 5/2010 | Kendall et al. | 439/628 |
| 2003/0103023 A1 * | 6/2003 | Ootsuka et al. | 345/87 |
| 2005/0105012 A1 * | 5/2005 | Kim et al. | 349/58 |
| 2005/0263659 A1 * | 12/2005 | Pfister et al. | 248/289.11 |
| 2005/0274858 A1 * | 12/2005 | Fedewa | 248/284.1 |
| 2006/0125360 A1 * | 6/2006 | Kim et al. | 312/405.1 |
| 2006/0261220 A1 * | 11/2006 | Lee et al. | 248/27.1 |
| 2007/0295020 A1 * | 12/2007 | Lee | 62/259.2 |

FOREIGN PATENT DOCUMENTS

| | | |
|---|---|---|
| JP | 2003-8246 A | 1/2003 |
| KR | 10-2006-0066316 A | 6/2006 |

* cited by examiner

DISPLAY ASSEMBLY FOR REFRIGERATOR

CROSS-REFERENCE TO RELATED APPLICATIONS

This application claims priority under 35 U.S.C. §119 to Korean Patent Application No. 2006-0056083, filed in Korea on Jun. 21, 2006, the entirety of which is hereby incorporated by reference.

BACKGROUND OF THE INVENTION

1. Field of the Invention

The present invention relates to a display assembly for a refrigerator and, more particularly, to a display assembly for a refrigerator capable of allowing a display unit providing information or implementing a TV function to be tilted from an external wall surface of a refrigerator.

2. Description of the Related Art

In general, a refrigerator is a device that its interior is shielded from external air, thus preventing external heat from being introduced thereinto, to which cooling air is provided to keep food items in storage at a low temperature within the refrigerator for a long time.

Recently, beyond its inherent function, the refrigerator provides extended functions such as providing a water dispenser, an ice maker, or a display unit.

Among them, in case of installation of the display unit, generally, the display unit is permanently attached as a fixed type on a front surface of the refrigerator. Thus, once fixed at the time the refrigerator is manufactured, the display unit cannot change in its position.

Meanwhile, as for the display unit attached on the outer wall surface of the refrigerator, because an installation space for the display unit is so small and narrow that a flat panel image display device such as an LCD is generally employed and an image display unit such as a Braun tube cannot be used. In addition, the flat panel image display device such as the LCD is increasingly commercially used in many industrial fields, but because of a restriction factor of liquid crystal itself, a viewing angle (sight angle) is limited.

Thus, the related art has a problem that screen images displayed on the display unit cannot be seen properly depending on an angle at which the display unit is viewed.

In addition, the flat panel image display device such as the LCD generates a considerably large amount of heat, which means it needs a heat releasing unit for releasing the generated heat. Releasing of the heat from the front surface of the refrigerator makes a user uncomfortable, so the heat releasing unit is generally formed on a rear surface of the display unit.

In this case, however, provided the display unit is permanently attached in the fixed form on the front surface of the refrigerator, external air cannot be transferred to the rear surface of the display unit, so the heat releasing unit should be additionally provided at the wall surface of the refrigerator.

SUMMARY OF THE INVENTION

Therefore, in order to address the above matters the various features described herein have been conceived. One aspect of the exemplary embodiments is to provide a display assembly for a refrigerator capable of overcoming a restriction of a viewing angle of a display unit by controlling direction of a screen of a display.

Another aspect of the exemplary embodiments is to provide a space allowing external air to pass through a heat releasing unit of a display to thus release heat generated from the heat releasing unit to the exterior.

This specification provides a display assembly for a refrigerator that may include: a display; a frame having a mounting part for mounting the display and provided on an outer wall surface of a refrigerator; and a tilting unit fixed to the display and the mounting part and allowing the display to be tilted.

The frame may be provided on a front surface of a door of the refrigerator.

The display may have a heat releasing unit formed on a rear surface thereof.

The tilting unit may include a shaft and one or more collars inserted into the shaft.

The shaft may be fixed to one of the mounting part and the rear surface of the display in a direction horizontal to the display, and the collars may be fixed to the other remaining one.

The mounting part may be formed such that it is protruded from a vertical central portion or a horizontal central portion of the frame with a pre-set height.

The shaft may have a polygonal shape in its section, and the collars may have a stopper that restrains rotation of the shaft by stages on its inner circumferential surface.

The stopper may be formed as an elastic member.

The tilting unit may include a ball housing fixed to one of the mounting part and the rear surface of the display; and a ball fixed to the other remaining one.

The ball may be inserted into the ball housing such that it has more than a pre-set frictional force with an inner surface of the ball housing.

One of the ball and the ball housing may be formed as an elastic member.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

A display assembly for a refrigerator according to a first exemplary embodiment of the present invention will now be described with reference to FIGS. 1 to 5.

Figure 1:
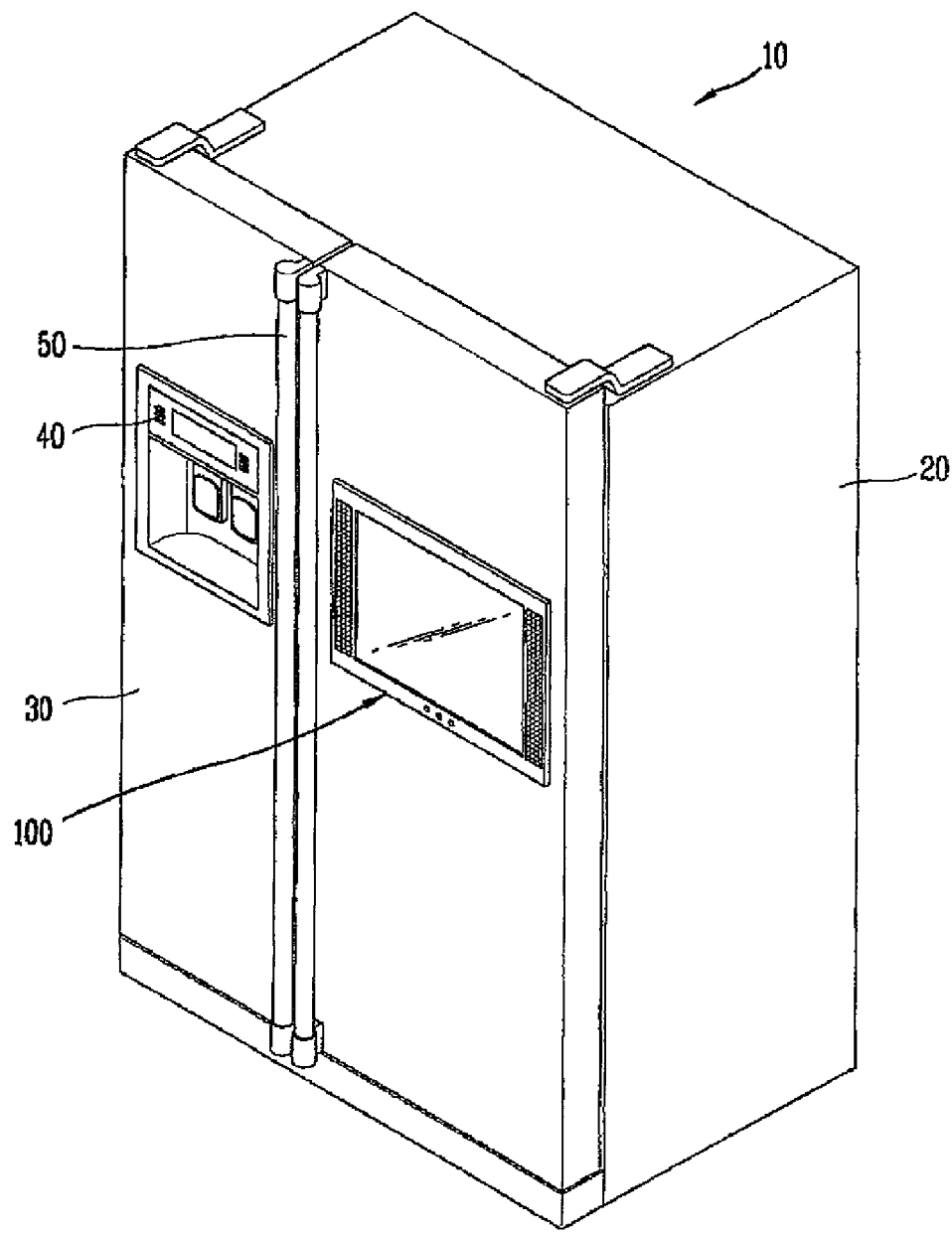
FIG. 1 is a perspective view showing a refrigerator having a display assembly according to an exemplary embodiment of the present invention.

FIG. 1 is a perspective view showing a refrigerator having a display assembly according to an exemplary embodiment of the present invention.

With reference to FIG. 1, a refrigerator 10 according to the present invention includes a main body 20 having a freezing space at a low temperature and/ore a refrigerating space formed therein, a pair of doors 30 that selectively opens and closes a front surface of the main body, handles 50 formed at an inner edges of the doors, a manipulating part 40 formed on one of the doors 30 and controlling an operation of the refrigerator, and a display unit 100 formed on the other of the doors 30.

In place of the manipulation part 40, a different device such as an ice maker or a water dispenser can be formed. In general, the doors make a rotational movement centering around a hinge formed at the inner edge portions of the doors.

The display unit 100 is provided on an outer wall surface of the refrigerator 10, and preferably, it is provided on the door 30 that the user contacts most frequently. In addition, it is more preferred that the display unit is provided on the front surface of the door 30 to cope with a case where the left and right sides of the refrigerator 10 are blocked while only the front surface of the refrigerator 10 is exposed according to a space where the refrigerator 10 is located.

Figure 2:
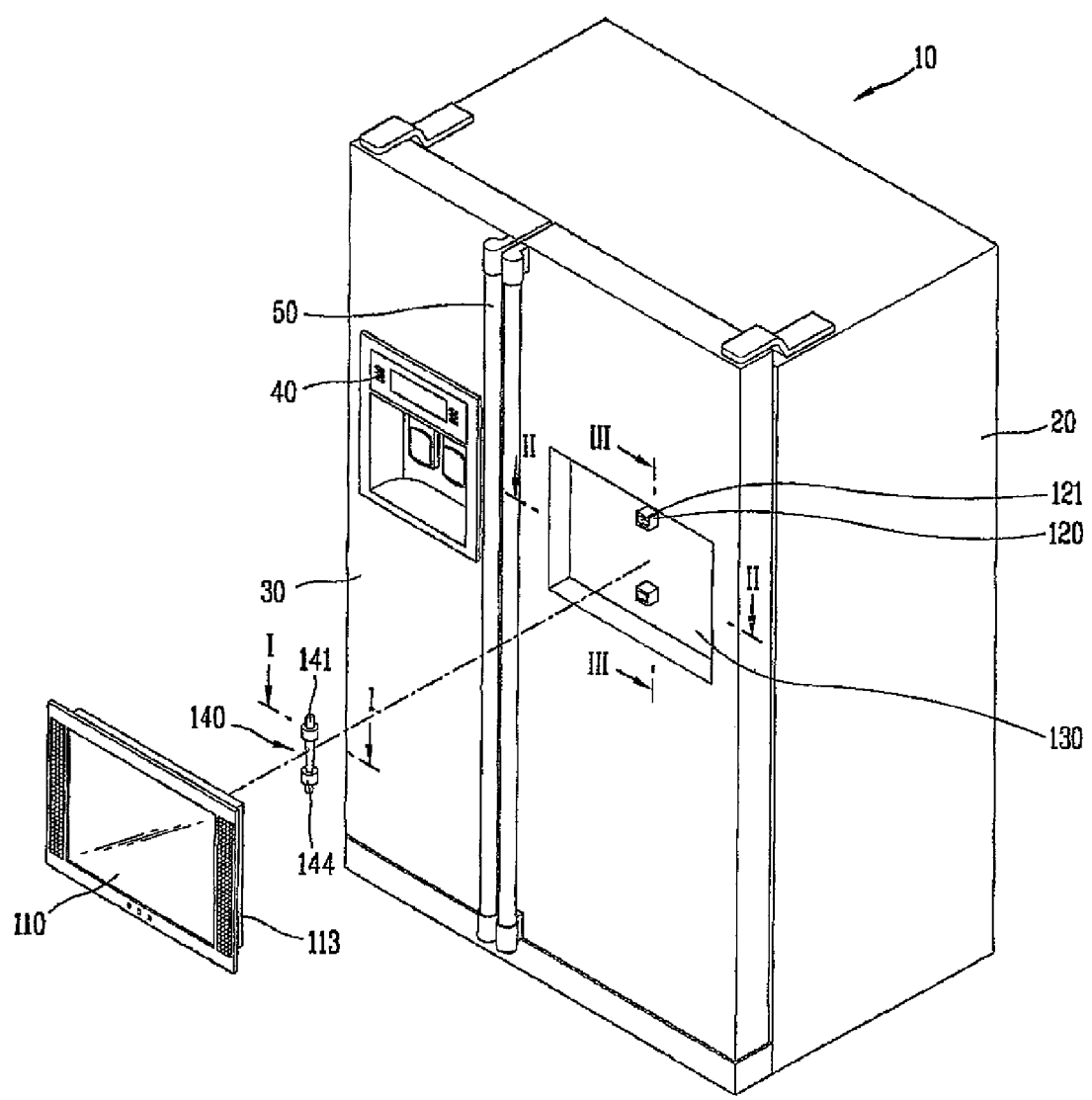
FIG. 2 is a view showing an exploded state of a display assembly for a refrigerator according to a first exemplary embodiment of the present invention.

FIG. 2 is a view showing an exploded state of a display assembly for a refrigerator according to a first exemplary embodiment of the present invention.

With reference to FIG. 2, a display assembly for a refrigerator according to a first exemplary embodiment of the present invention includes: a display 110 that processes information or performs a TV function, a frame 130 having a mounting part 120 for mounting the display 110 and provided on an outer wall surface of the refrigerator, and a tilting unit 140 fixed at the display 110 an the mounting part 120 and allowing the display 110 to be tilted.

The display 110 is received in the frame 130. Specifically, the display 110 is fixed on the mounting part 120 provided in the frame 130, and the display 110 and the mounting part 130 are combined by the tilting unit 140. As the display unit 110, preferably, an LCD is used because it is so thin as to be installed without occupying much space on the front surface of the door 3. In addition, a heat releasing part 113 is provided on the rear surface of the display 110 in order to release heat generated from the interior of the display 110 to the exterior.

Here, the frame 130 can be formed at any position of the outer wall surface of the refrigerator, and as shown in FIG. 2, preferably, it is formed on the front surface of the door 30 of the refrigerator. The frame 130 includes mounting part 120 formed to be protruded from its front surface. In addition, the frame 130 can be provided on the surface of the outer wall surface of the refrigerator. In this case, preferably, in order to accommodate the display unit 110 in an inward portion of the wall surface of the refrigerator, an area of the wall surface of the refrigerator may retreat with a certain depth that may sufficiently receive the display to thus form a display receiving space, and then the frame 130 to which the display unit 110 is to be combined is fixed.

The mounting part 120 is formed as a vertical central portion of the frame 130 is provided with a pre-set height from its front surface, and includes a recess 121 to allow the tilting unit 140 to be combined therewith. The recess 121 is provided at the mounting part 120 such that the collar 144 of the tilting unit 140 is inserted therein. Preferably, two mounting parts are formed at upper and lower portions of the frame 130.

Here, the reason why the mounting part 120 is protruded is to secure a certain space between the rear surface of the display 110 and the frame 130. The space allows the display 110 to be tilted and external air to be introduced therein to take heat from the heat releasing unit 113 provided on the rear surface of the display 110.

The mounting part 120 may have a slope face which becomes downwardly inclined as it goes toward edges of the frame 130 from the protruded central portion.

Namely, it is preferred that the slope face is protruded vertically long from the central portion of the frame 130 and extends with its height being reduced as it goes toward the edges of the left and right sides of the frame 130. In this case, the slope formed by the slope face determines a maximum tilting angle of the display 110.

The tilting unit 140 allows the display 110 fixed at the frame 130 to be tilted and includes a shaft 141 and a collar 144.

The shaft 141 is installed vertically on the rear surface of the display 110, and the collar 144 is fixed in the recess 121 of the mounting part 120 provided at the frame 130 and combines the display 110 and the mounting part 120. Also, the shaft 141 allows the display 110 to be tilted left and right in the frame 130.

Figure 3:
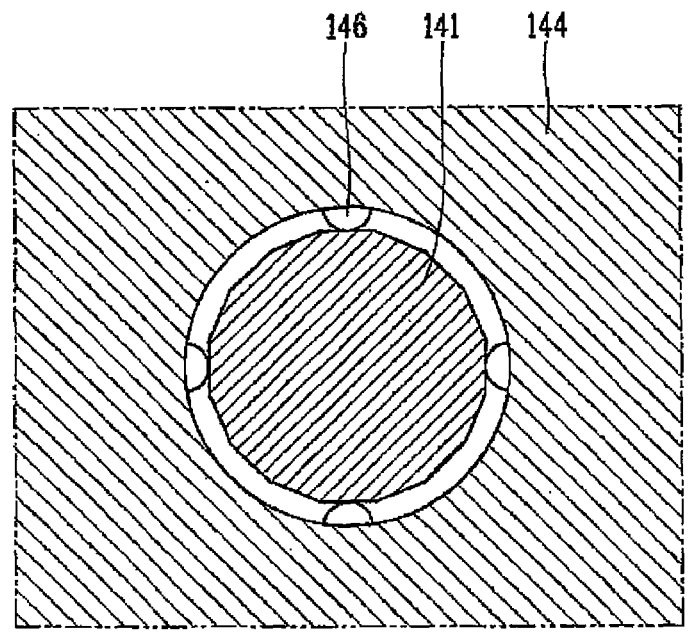
FIG. 3 is a sectional view taken along line I-I' in FIG. 2.

FIG. 3 is a sectional view taken along line I-I' in FIG. 2. Specifically, FIG. 3 shows a section of the tilting unit provided at the display assembly for the refrigerator according to the first exemplary embodiment of the present invention.

With reference to FIG. 3, as for the shaft 141, its portion, where the collar 144 is inserted, has a polygonal section so that the collar 144 can be rotated by stages at the shaft 141. In this case, preferably, the shaft 141 has a section of more than 16-angular shape so that the display 110 can be tilted at various angles.

The collar 144 is inserted to the shaft 141 formed to be vertically long on the rear surface of the display 110, and in this case, in order to stably mount the display 110 in the frame 130, two collars may be inserted at upper and lower portions of the shaft 141.

The collar 144 includes stoppers 146 corresponding to an outer circumferential surface of the shaft 141 so as to move by stages at the shaft 141. Preferably, the stoppers 146 have electricity so that when the shaft 141 is rotated, it can be rotated by being caught by the stoppers 146 by stages.

The display 110 can be fixed in a state of being directed forward or can be fixed in a state of being horizontally tilted.

Although the shaft 141 does not have a polygonal section, namely, although the shaft 141 has a circular section, the display can be tilted by providing a frictional force between the shaft 11 and the inner circumferential surface of the collar 144 by more than a certain level.

Figure 4:
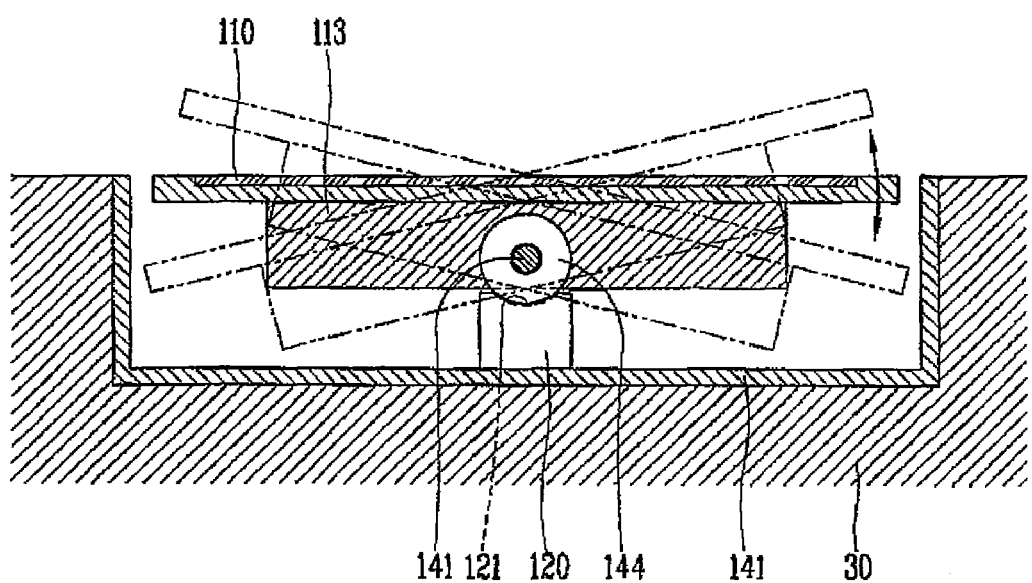
FIG. 4 is a sectional view taken along line II-II' in FIG. 2.

FIG. 4 is a sectional view taken along line II-II' in FIG. 2. Specifically, FIG. 4 shows an operational section of the display assembly for the refrigerator according to the first exemplary embodiment of the present invention.

As shown in FIG. 4, the display 110 is mounted in the frame 130, for which the collar 144 is inserted in the recess 121 provided at the mounting part 120. When the display 110 is mounted in the frame, an empty space is formed between the rear surface of the display 110 and the frame 130. Accordingly, when the left or right portion of the display 110 is pressed, the shaft 141 is rotated by stages with respect to the collar 144 fixed in the recess 121 formed at the mounting part 120, and accordingly, the display 110 may incline left or right. By doing that, a user can properly watch content displayed on the display 110 even from a side where the display 110 may not be well seen due to its viewing angle. In addition, because external air may pass through the empty space between the rear surface of the display 110 and the frame 130, heat generated within the display 110 can be released.

Thus far, the display assembly for the refrigerator of the present disclosure has been described to have the structure that the collar 144 is combined with the recess 121 provided at the mounting part 120 provided at the frame. But without being limited thereto, many modifications can be possibly implemented by the person in the art.

Figure 5A:
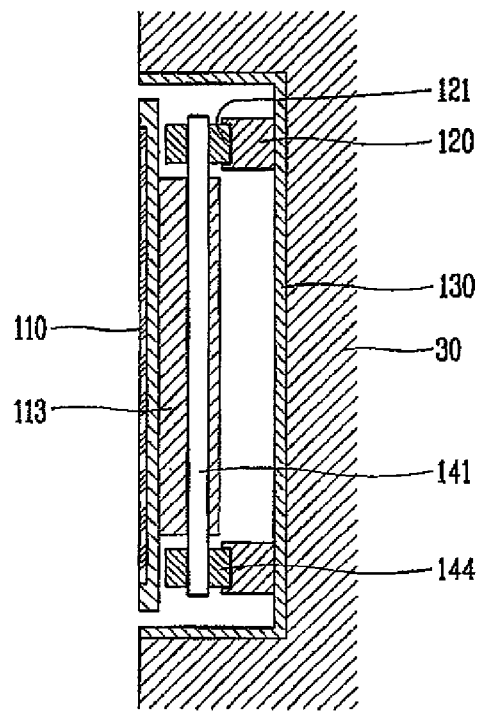
FIG. 5A is a sectional view taken along line III'-III' in FIG. 2.
Figure 5B:
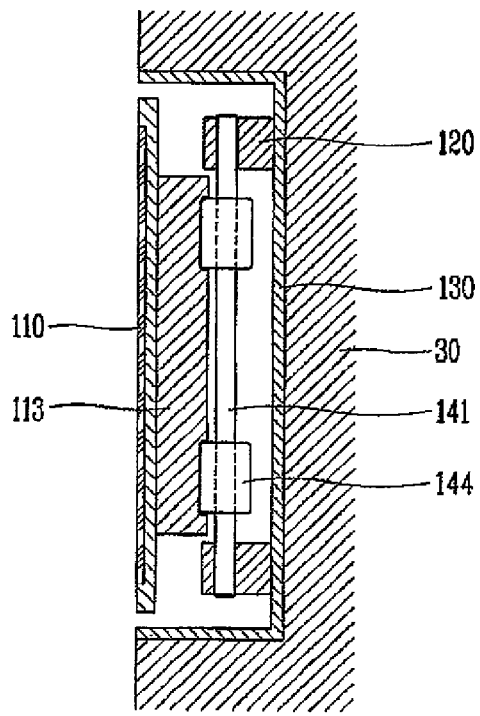
FIG. 5B is a sectional view showing a first modification of FIG. 5A.
Figure 5C:
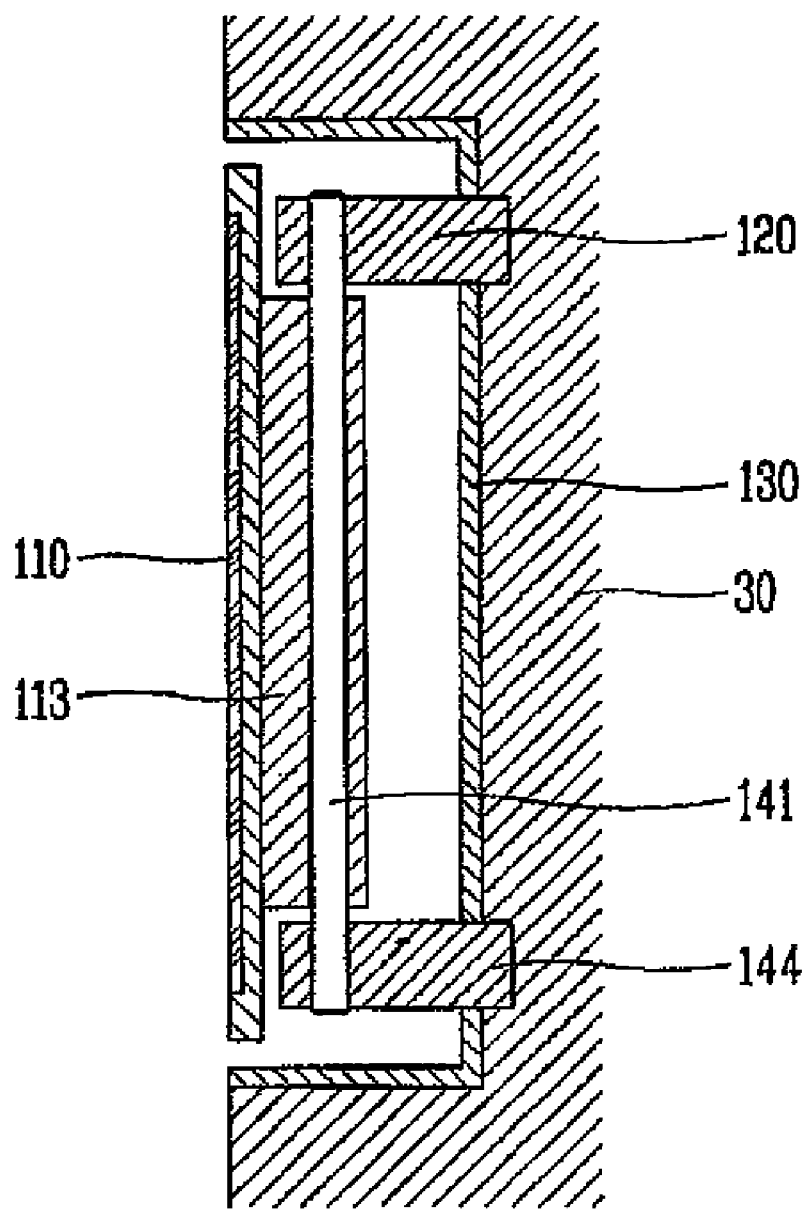
FIG. 5C is a sectional view showing a second modification of FIG. 5A.

FIGS. 5A to 5C show a state that the tilting unit 140 is combined with the display unit 110 and the mounting part 120. Specifically, FIG. 5A is a sectional view taken along line III-III' in FIG. 2, and FIGS. 5B and 5C are sectional views respectively showing first and second modifications of FIG. 5A.

With reference to FIG. 5A, the shaft 141 is combined with the rear surface of the display 110 in a direction perpendicular to the display 110. The collar 144 is inserted into the shaft 141 and provided in the recess 121 of the mounting part 120.

With reference to FIG. 5B, the shaft 141 can be combined with the mounting part 120 in the direction perpendicular to the display 110, for which the mounting part 120 includes a hole to allow the shaft 141 to be insertedly fixed therein. The collar 144 is inserted into the shaft 141 and fixed on the rear surface of the display 110

With reference to FIG. 5C, the shaft 141 is combined with the rear surface of the display 110 in a direction perpendicular to the display 110, and the collar 144 is inserted into the shaft 141. The collar 144 may be directly fixed to the frame 130, and in this case, one end portion of the collar 144 extends to be fixed.

A display assembly for a refrigerator according to a second exemplary embodiment of the present invention will now be described with reference to FIG. 6. In describing the display assembly for a refrigerator according to the second exemplary embodiment of the present invention, repeated content as that described in the first exemplary embodiment will be omitted.

Figure 6:
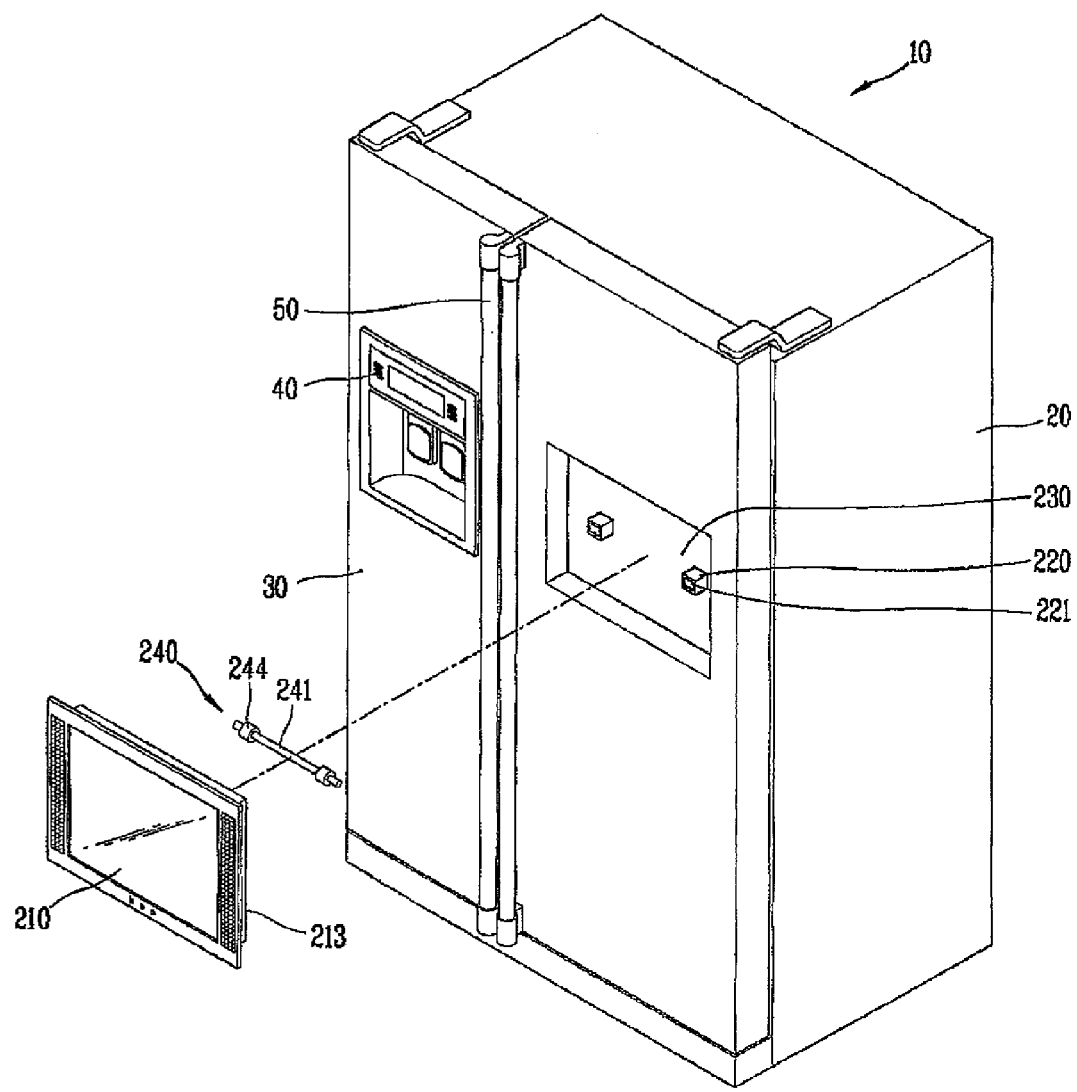
FIG. 6 is a view showing an exploded state of a display assembly for a refrigerator according to a second exemplary embodiment of the present invention.

With reference to FIG. 6, the display assembly for a refrigerator according to the second exemplary embodiment of the present invention includes: a display 210 that processes information or performs a TV function, a frame 230 having a mounting part 220 for mounting the display 210 and provided on an outer wall surface 20 of the refrigerator, and a tilting unit 240 fixed at the display 210 an the mounting part 220 and allowing the display 210 to be tilted.

The mounting part 220 is formed as a horizontal central portion of the frame 210 is protruded with a preset height from its front surface, and includes a recess 221 in which the tilting unit 240 is combined. The recess 221 is formed at the mounting part 220 such that the collar 244 of the tilting unit 240 is inserted therein. Preferably, two mounting parts are formed at left and right portions of the frame 230.

Here, the reason why the mounting part 220 is protruded is to secure a certain space between the rear surface of the display 210 and the frame 230. The space allows the display 210 to be tilted and external air to be introduced therein to take heat from the heat releasing unit 213 provided on the rear surface of the display 210.

The mounting part 220 may have a slope face which becomes downwardly inclined as it goes toward edges of the frame 230 from the protruded central portion.

Namely, it is preferred that the slope face is protruded horizontally long from the central portion of the frame 230 and extends with its height being reduced as it goes toward the edges of the upper and lower sides of the frame 230. In this case, the slope formed by the slope face determines a maximum tilting angle of the display 210.

The tilting unit 240 allows the display 210 fixed at the frame 230 to be tilted and includes a shaft 241 and a collar 244.

The shaft 241 is installed horizontally on the rear surface of the display 210, and the collar 244 is fixed in the recess 221 of the mounting part 220 provided at the frame 230 and combines the display 210 and the mounting part 220. Also, the shaft 241 allows the display 210 to be tilted up and down in the frame 230.

Figure 7:
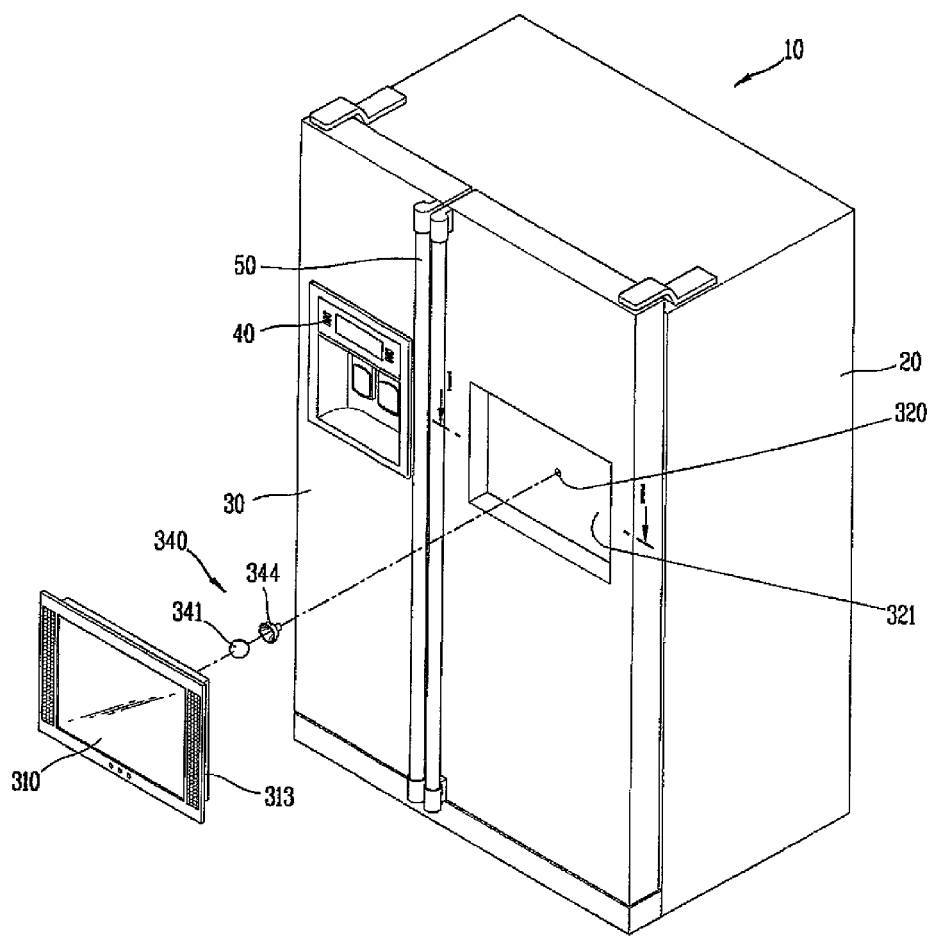
FIG. 7 is a view showing an exploded state of a display assembly for a refrigerator according to a third exemplary embodiment of the present invention.
Figure 8:
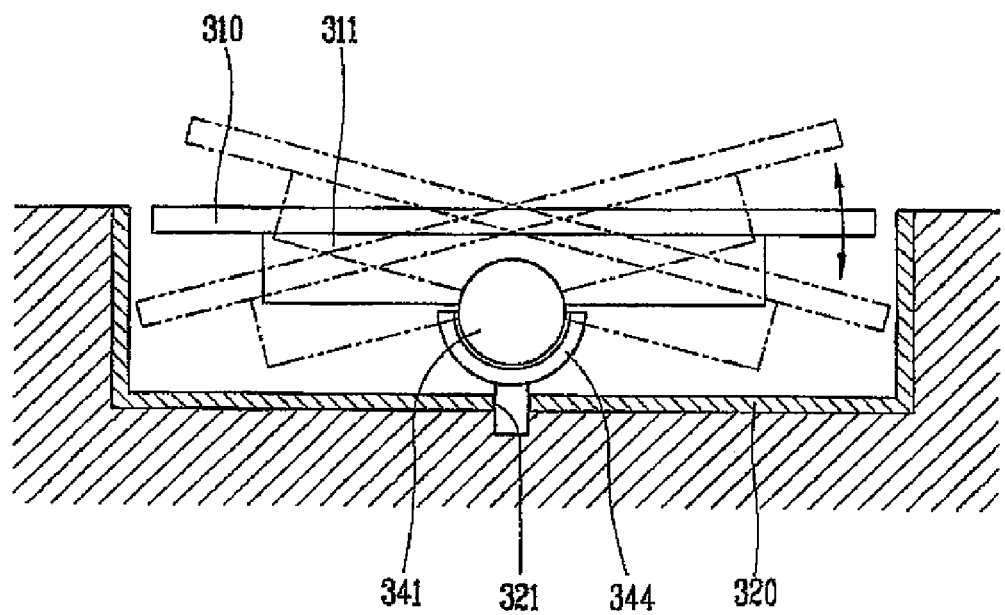
FIG. 8 is a sectional view taken along line I-I' in FIG. 7.

A display assembly for a refrigerator according to a third exemplary embodiment of the present invention will now be described with reference to FIGS. 7 and 8. In describing the display assembly for a refrigerator according to the third exemplary embodiment of the present invention, repeated content as that described in the first exemplary embodiment of the present invention will be omitted.

The display assembly for a refrigerator according to the third exemplary embodiment of the present invention includes: a display 310 that processes information or performs a TV function, a frame 330 having a mounting part 320 for mounting the display 310 and provided on an outer wall surface 20 of the refrigerator, and a tilting unit 340 fixed at the display 210 an the mounting part 320 and allowing the display 310 to be tilted.

Here, the tilting unit 340 includes a ball housing 344 fixed at one of the mounting part 320 and a rear surface of the display 310 and a ball 341 fixed at the other remaining one. The ball 341 is inserted in the ball housing 344 such that it has more than a pre-set frictional force with an inner surface of the ball housing 344. Preferably, at least one of the ball 341 and the ball housing 344 is formed as an elastic member.

Accordingly, space is formed between the rear surface of the display 310 and the frame 330 by size corresponding to the size of the ball housing 344. In addition, the display 310 can be tilted in any direction of up/down and left/right. Because there is formed the empty space by the ball housing 344 or the ball 341, the mounting part 320 does not need to be protruded. In addition, because the ball 341 or the ball housing 344 can be directly fixed in the frame 330 without the necessity of the mounting part 320.

As so far described, the display assembly for the refrigerator according to the present invention has many advantages.

That is, first, the direction of the screen of the display can be controlled.

Second, the restriction of the viewing angle of the display can be overcome.

Third, the direction of the screen of the display can be controlled by stages.

Fourth, heat generated from the display can be released externally.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A display assembly for a refrigerator comprising:
   a display;
   a frame having a mounting part for mounting the display and provided on an outer wall surface of a refrigerator; and
   a tilting unit fixed to the display and the mounting part and allowing the display to be tilted,
   wherein the tilting unit comprises:
   a shaft having a polygonal section; and
   one or more collars inserted in the shaft, the collar including a stopper provided on its inner circumferential surface and restraining rotation of the shaft by stages.

2. The assembly of claim 1, wherein the shaft is fixed to one of the mounting part and a rear surface of the display in a direction perpendicular to the display, and the collar is fixed to the other remaining one.

3. The assembly of claim 2, wherein the mounting part is formed as a vertical central portion of the frame and is protruded with a pre-set height.

4. The assembly of claim 1, wherein the stopper is formed as an elastic member.

5. The assembly of claim 1, wherein the shaft is fixed to one of the mounting part and a rear surface of the display in a direction horizontal to the display, and the collar is fixed to the other remaining one.

6. The assembly of claim 5, wherein the mounting part is formed as a horizontal central portion of the frame and is protruded with a pre-set height.

7. The assembly of claim 1, wherein the frame is provided on a front surface of a refrigerator door.

8. The assembly of claim 1, wherein a heat releasing unit is provided on a rear surface of the display.

* * * * *